(12) United States Patent
Itskovich et al.

(10) Patent No.: US 8,332,152 B2
(45) Date of Patent: *Dec. 11, 2012

(54) METHOD AND APPARATUS FOR ELIMINATING DRILL EFFECT IN PULSE INDUCTION MEASUREMENTS

(75) Inventors: Gregory B. Itskovich, Houston, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 791 days.

This patent is subject to a terminal disclaimer.

(21) Appl. No.: 12/077,338

(22) Filed: Mar. 19, 2008

(65) Prior Publication Data

US 2009/0240435 A1   Sep. 24, 2009

(51) Int. Cl.
*G01V 1/40* (2006.01)
*G01V 3/18* (2006.01)
*G01V 9/00* (2006.01)

(52) U.S. Cl. ........ 702/7; 702/6; 702/9; 702/11; 324/339

(58) Field of Classification Search ............... 702/6, 7, 702/9, 11; 324/338, 339
See application file for complete search history.

(56) References Cited

U.S. PATENT DOCUMENTS

| | | | | |
|---|---|---|---|---|
| 5,811,972 | A * | 9/1998 | Thompson et al. | 324/338 |
| 6,184,685 | B1 * | 2/2001 | Paulk et al. | 324/338 |
| 6,218,842 | B1 * | 4/2001 | Bittar et al. | 324/339 |
| 6,359,438 | B1 * | 3/2002 | Bittar | 324/369 |
| 7,141,981 | B2 * | 11/2006 | Folberth et al. | 324/334 |
| 7,167,006 | B2 * | 1/2007 | Itskovich | 324/338 |
| 2002/0101242 | A1 * | 8/2002 | Bittar | 324/338 |
| 2004/0090234 | A1 | 5/2004 | Macune | |
| 2005/0046424 | A1 | 3/2005 | Sinclair et al. | |
| 2007/0229081 | A1 * | 10/2007 | Frey | 324/323 |
| 2007/0229082 | A1 * | 10/2007 | Vehra et al. | 324/339 |

* cited by examiner

*Primary Examiner* — Janet Suglo

(74) *Attorney, Agent, or Firm* — Mossman Kumar & Tyler PC

(57) ABSTRACT

A method and apparatus provide a time-dependent calibration to essentially eliminate pipe effect in pulse-induction logging while drilling. Use of two receivers to provide calibration and measurement information allows determination of formation properties in a downhole environment while eliminating the effect of tool effects.

20 Claims, 4 Drawing Sheets

METHOD AND APPARATUS FOR ELIMINATING DRILL EFFECT IN PULSE INDUCTION MEASUREMENTS

FIELD OF THE INVENTION

The invention concerns reduction of the drill effect on transient induction measurements by use of a calibration technique.

BACKGROUND OF THE INVENTION

Use of pulse induction logging while drilling ("LWD") resistivity measurements in downhole environments provides information about formations surrounding the borehole. Use of such techniques allows the continuation of drilling while acquiring information needed for drill steering, or to determine proximity to formation interfaces, such as gas-oil, gas-water, or water-oil interfaces.

U.S. Pat. No. 7,167,006 ("the '006 patent") to Itskovich, the specification of which is incorporated herein by reference, describes an apparatus and method for a pulse induction LWD system using a multi-receiver array. Use of that invention provides improved resolution of signals, allowing resolution of signals that would otherwise be unresolvable. This improved resolution is accomplished in that case by acquiring a calibration signal while the measurement tool is outside of the formation, and subtracting the calibration signal from the measurement signal obtained while the tool is in the downhole environment.

While the calibration technique of the '006 patent provides improved resolution, still further improvements in pulse induction LWD measurements are possible. Use of two receivers in the tool can allow time-dependent calibration signals to be acquired from both receivers. These calibration signals can then be combined to create a time-dependent calibration coefficient. When pulse induction LWD measurements are taken downhole, the measurement signals received by the two receivers can be combined with the calibration coefficient to generate a time-dependent differential measurement signal. This high resolution signal provides an improved ability to resolve interfaces in the formation surrounding the borehole.

Accordingly, it is an object of the invention to provide improved resolution of boundary locations in formations surrounding boreholes.

It is another object of the invention to provide measurements of boundaries in formations for use in real-time geo-steering of drilling operations.

It is yet another object of the invention to provide measurements to determine the location of interfaces in a formation, such as gas-water, gas-oil, or water-oil interfaces.

SUMMARY OF THE INVENTION

The invention comprises a method and apparatus for substantially eliminating the drill effect in pulse induction LWD resistivity measurements. A multi-stage method comprises a first calibration stage and a second measurement stage. The apparatus used in performing these measurements comprises a transmitter and two receivers. The receivers are longitudinally separated from the transmitter on the tool, and may be placed on the same side of the transmitter or may be placed on opposite sides of the transmitter. In a preferred embodiment, the transmitter and the receivers are mounted on a conductive section, covered with a ferrite shield.

Spacing between the receivers and the transmitter is primarily a matter of engineering choice. However, if the tool is to be used in a geo-steering application, it is important to avoid symmetrical placement of the receivers relative to the transmitter. In the event that the borehole runs parallel to a boundary, such as a water-oil boundary, symmetrical placement of the receivers relative to the transmitter could result in a zero-signal result using the calibration method of this invention.

In accordance with the invention, while outside of the formation, the tool is placed in the presence of a pipe and pulse induction measurements are made by inducing a time-dependent current in the transmitter. Time-dependent calibration signals are obtained and recorded from each of the receivers. These calibration signals provide information reflecting the effects of the pipe at the receivers. The calibration phase thus provides time-dependent calibration signals $C_1(t)$ and $C_2(t)$. These signals can be recorded in a processor, such as a computer.

Once the calibration information is recorded, the tool may be run downhole to a position within a formation to be tested. Pulse induction resistivity measurements can then be made, again by inducing a time-dependent current in the transmitter, and utilizing the same pulse heights and timing as with the calibration phase. The two receivers will thus produce time-dependent measurement responses $S_1(t)$ and $S_2(t)$. Providing these signals to the processor storing the calibration information allows the resolution of a time-dependent differential signal $\Delta S(t)=S_2(t)-(S_1(t) \cdot C_2(t)/C_1(t))$. This differential signal is substantially unaffected by the pipe and allows determination of parameters of the surrounding formation.

DETAILED DESCRIPTION

Figure 1:
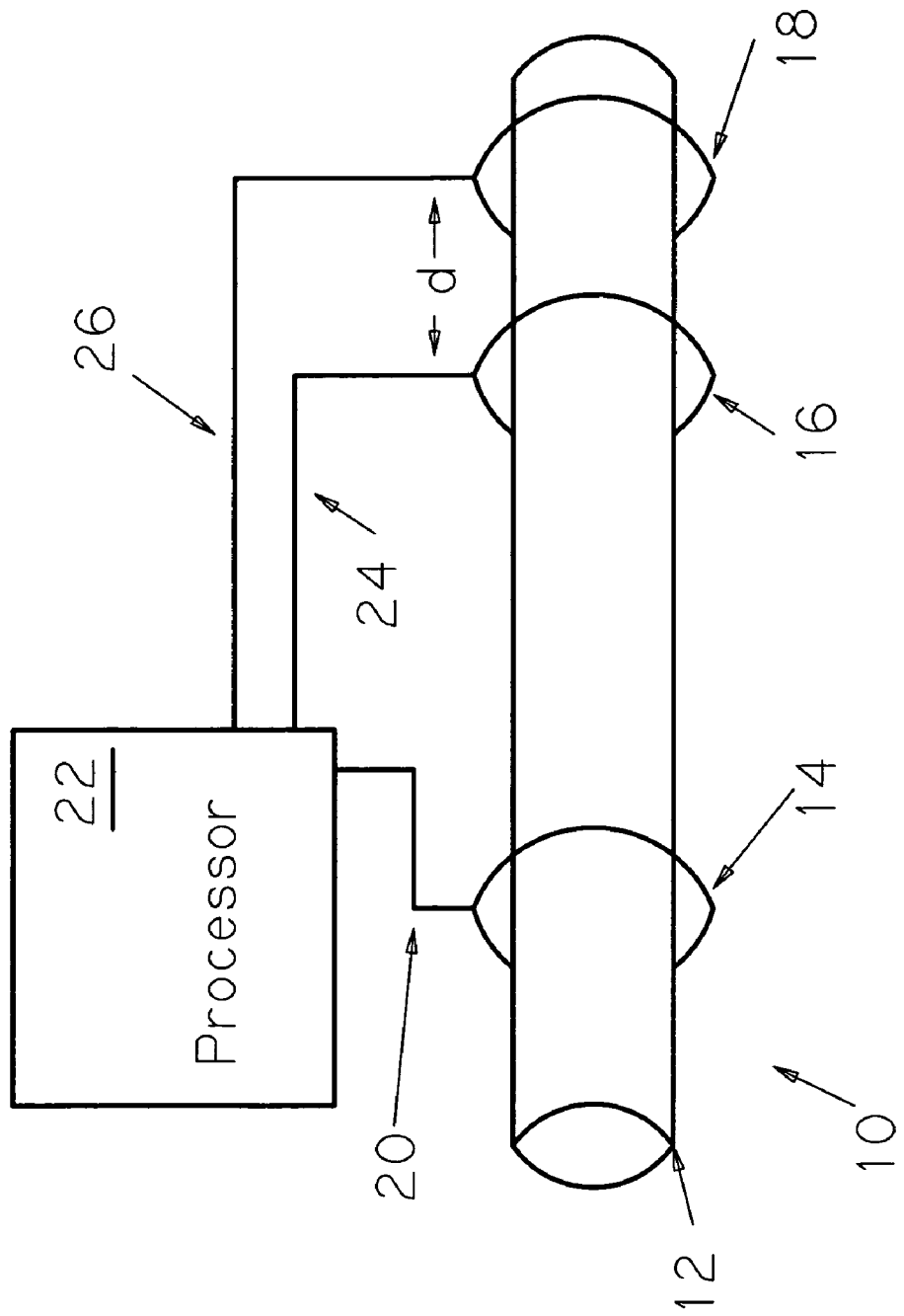
FIG. 1 is a schematic drawing of one embodiment of a tool of the present invention.

Referring to FIG. 1, a schematic representation of a tool of the present invention is shown. Tool 10 comprises a mandrel 12, preferably with a conductive body of a material such as ferrite. A transmitter 14 is spaced longitudinally away from a first receiver 16 and a second receiver 18. Transmitter 14 is electrically connected via connection 20 to a processor, such as a computer, 22 which provides the current pulses used in the LWD resistivity measurements. First receiver 16 and second receiver 18 are connected to processor 22 via connections 24 and 26, respectively. Processor 22 stores calibration information and processes received signals during pulsed induction measurements, and may optionally be used to control the steering of a drill bit. Those of skill in the art will recognize that processor 22 may embody one or more computers, and may be controlled via a user interface or programmed for automatic operation.

First receiver 16 and second receiver 18 are oriented along the same direction. The spacing d between first receiver 16 and second receiver 18 is a matter of engineering preference, and these receivers may optionally be placed on opposite sides of transmitter 14. However, as noted above, the receivers should not be symmetrically placed about transmitter 14 in a geo-steering application, because application of the present invention may result in zero signal in this configuration if the borehole parallels a water-oil boundary.

Figure 2:
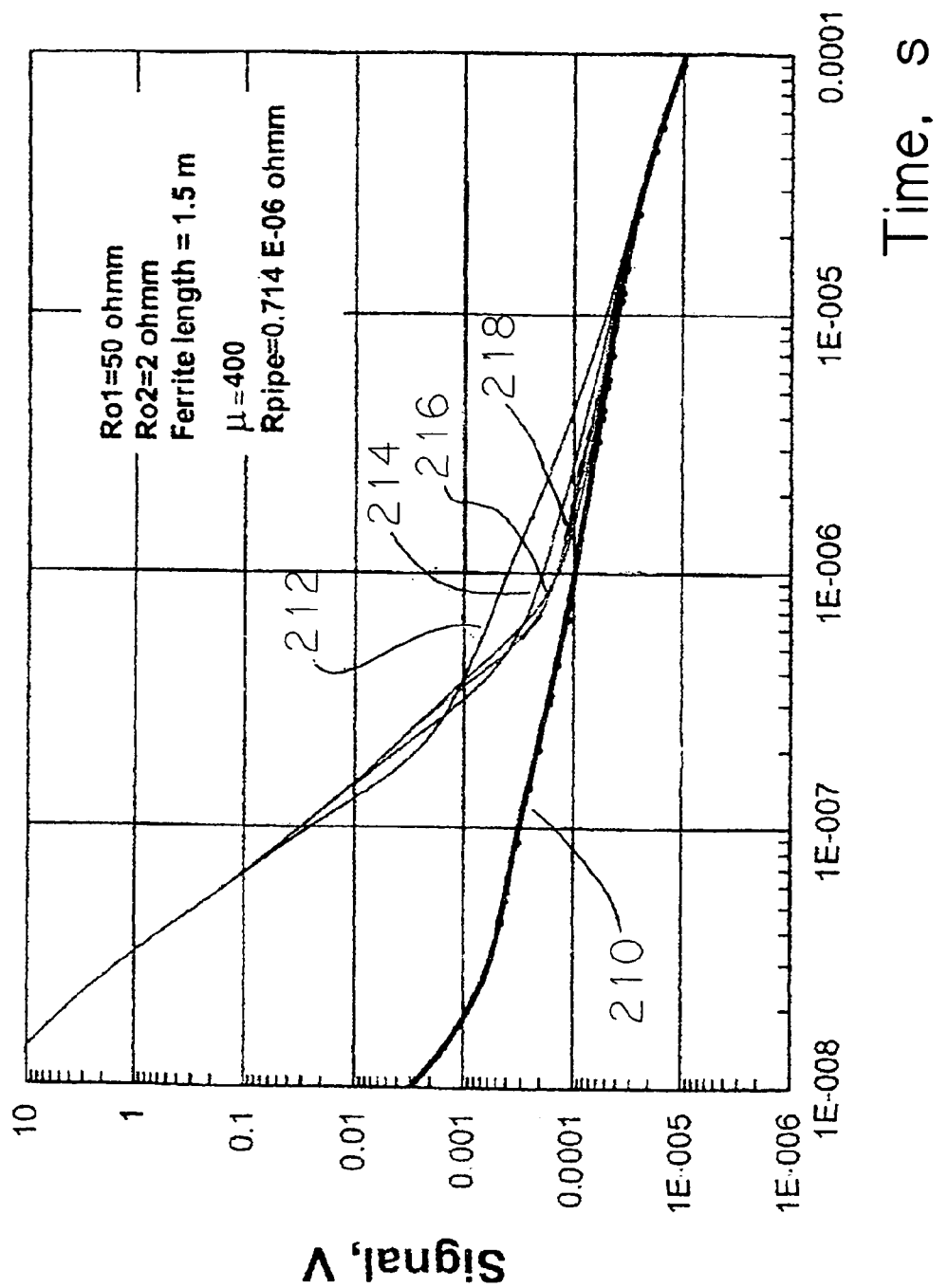
FIG. 2 is a graph depicting modeling results of a pulsed induction measurement for a tool with a transmitter and a single receiver at a spacing of 0.5 meter.

Referring to FIG. 2, modeling results are shown for a first receiver (such as first receiver 16 of FIG. 1) spaced at 0.5 meter from a transmitter (such as transmitter 14 of FIG. 1). The results are modeled for a boundary between two layers of resistivities of 50 Ω·m and 2 Ω·m, respectively. The model includes a conductive pipe with resistance of $0.714 \cdot 10^{-6}$ Ω·m, and a ferrite nonconductive shield of length 1.5 m and $\mu = 400$. First calibration curve 210 reflects the signal from the pipe alone in the absence of a formation. First measurement curve 212 reflects the signal from the formation with a boundary spaced four meters from the tool. Second measurement curve 214 reflects the signal from the formation with a boundary spaced six meters from the tool. Third measurement curve 216 reflects the signal from the formation with a boundary spaced eight meters from the tool, and fourth measurement curve 218 reflects the signal from the formation with a boundary spaced ten meters from the tool. The second, third, and fourth measurement curves are insufficiently resolved to provide meaningful information.

Figure 3:
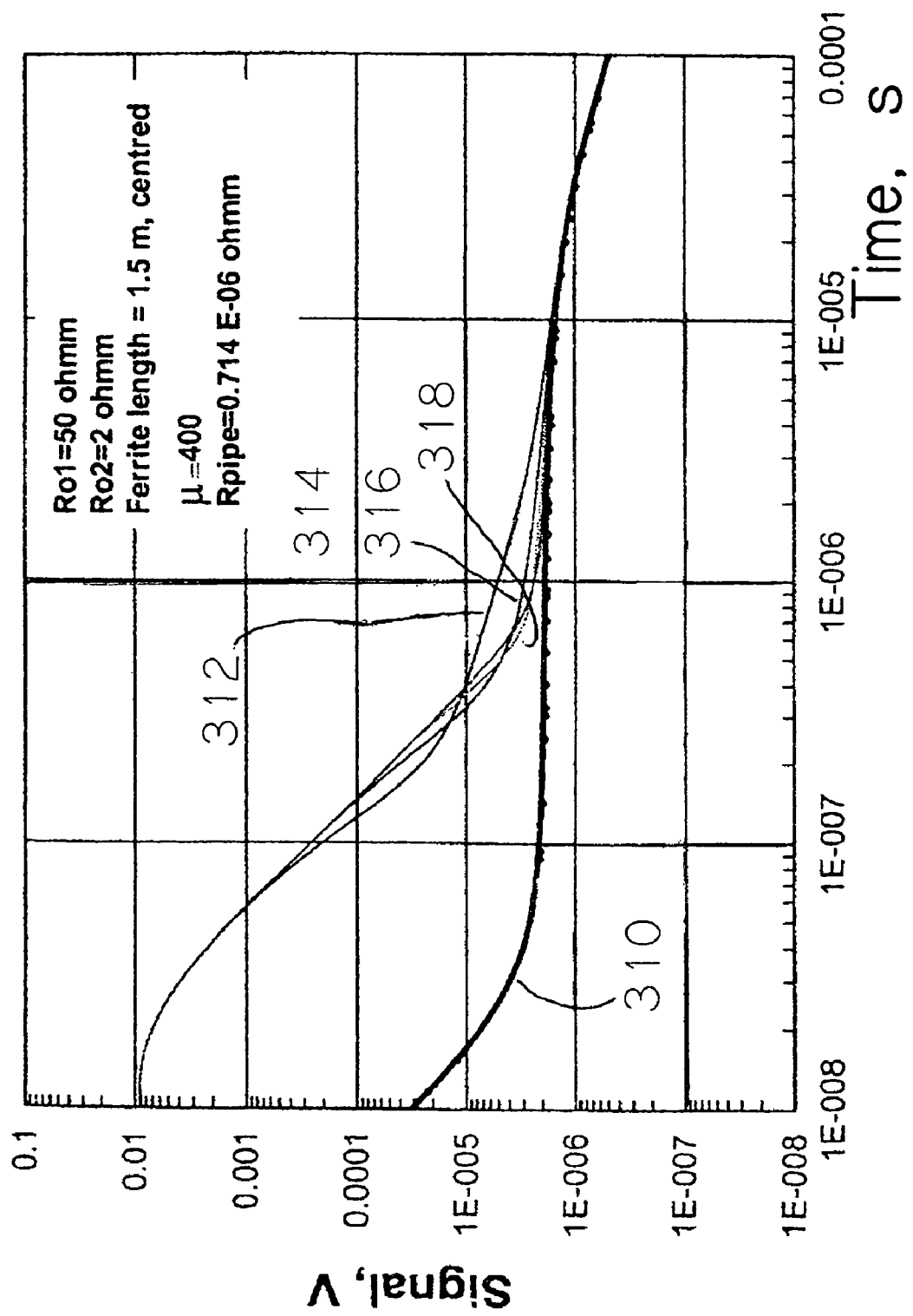
FIG. 3 is a graph depicting modeling results of a pulsed induction measurement for a tool with a transmitter and a single receiver at a spacing of 2 meters.

Similarly, referring to FIG. 3, measurement curves are modeled for the same formation and pipe parameters as in FIG. 2, but with a second receiver (such as second receiver 18 of FIG. 1) spaced at 2 meters from a transmitter (such as transmitter 14 of FIG. 1). Second calibration curve 310 reflects the signal from the pipe alone in the absence of a formation. Fifth measurement curve 312 reflects the signal from the formation with a boundary spaced four meters from the tool. Sixth measurement curve 314 reflects the signal from the formation with a boundary spaced six meters from the tool. Seventh measurement curve 316 reflects the signal from the formation with a boundary spaced eight meters from the tool, and eighth measurement curve 318 reflects the signal from the formation with a boundary spaced ten meters from the tool. Similarly to FIG. 2, the sixth, seventh, and eighth measurement curves are insufficiently resolved to provide meaningful information.

Figure 4:
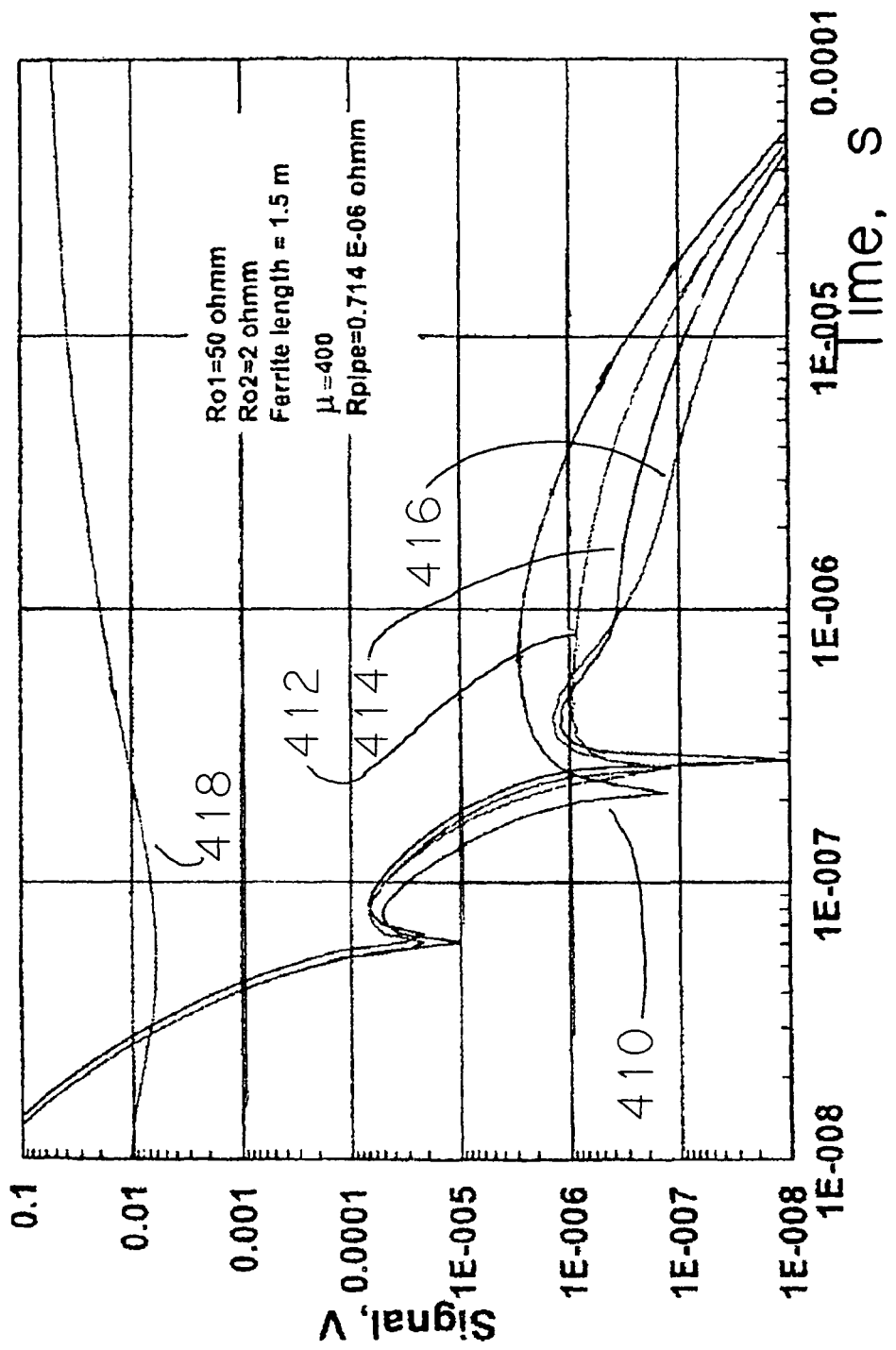
FIG. 4 is a graph depicting the results of applying the present invention by combining the results of the tests depicting in FIGS. 2 and 3.

However, application of the method of the present invention to the data of FIGS. 2 and 3 provides a more meaningful result, as reflected in FIG. 4. Four calculated curves 410, 412, 414, and 416 are depicted as calculated for the boundary spacings of 4, 6, 8, and 10 meters, respectively. These curves are calculated by determining, for each curve, $$\Delta S(t) = S_2(t) - (S_1(t) \cdot C_2(t) / C_1(t)).$$

For example, for the four meter boundary distance curve, $S_1(t)$ is depicted by first measurement curve 212 of FIG. 2, and $S_2(t)$ is depicted by fifth measurement curve 312 of FIG. 3. For each of the four curves, $C_1(t)$ is first calibration curve 210 of FIG. 2, and $C_2(t)$ is depicted by second calibration curve 310 of FIG. 3. The time-dependent calibration coefficient $C_2(t)/C_1(t)$ is shown in FIG. 4 as curve 418. As reflected in FIG. 4, application of the present invention to these curves produces adequate resolution to allow determination of boundary locations at each of the 4, 6, 8, and 10 meter positions.

The above examples are included for demonstration purposes only and not as limitations on the scope of the invention. Other variations in the construction of the invention may be made without departing from the spirit of the invention, and those of skill in the art will recognize that these descriptions are provide by way of example only.

We claim:

1. A method of conducting drilling operations in an earth formation, the method comprising:
    conveying an electromagnetic instrument in a borehole in the earth formation;
    changing a current through a transmitter on the electromagnetic instrument and inducing a current in the earth formation;
    receiving a first temporal signal resulting from the induced current in a first receiver on the electromagnetic instrument, the received first temporal signal including an effect of a conductive body of the electromagnetic instrument;
    receiving a second temporal signal resulting from the induced current in a second receiver on the electromagnetic instrument, the received second temporal signal including the effect of the conductive body of the electromagnetic instrument; and
    using the first temporal signal, the second temporal signal, and a ratio between a first reference signal and a second reference signal for estimating a distance to an interface in the earth formation, wherein estimating the distance comprises:
        determining a time-dependent product of the ratio and the first temporal signal; and
        subtracting the product from the second temporal signal.

2. The method of claim 1 further comprising obtaining the first reference signal and the second reference signal in the absence of the formation.

3. The method of claim 1 wherein the transmitter has an axis substantially parallel to an axis of the electromagnetic instrument.

4. The method of claim 1 further comprising positioning the first receiver and the second receiver on the same side of the transmitter.

5. The method of claim 1 wherein the electromagnetic instrument is conveyed on a bottomhole assembly into the borehole.

6. The method of claim 1 further comprising using the determined distance for controlling a direction of drilling.

7. The method of claim 1 wherein the interface further comprises a bed boundary.

8. The method of claim 1 wherein the interface further comprises a fluid interface selected from: (i) a gas-oil interface, (ii) an oil-water interface, and (iii) a gas-water interface.

9. The method of claim 1 wherein the reference signals are time-dependent.

10. The method of claim 1 further comprising:
    obtaining the reference signals while the electromagnetic instrument is apart from the earth formation.

11. An apparatus configured to conduct drilling operations, the apparatus comprising:
    an electromagnetic instrument configured to be conveyed in a borehole, the electromagnetic instrument including a transmitter, a first receiver and a second receiver; and
    a processor configured to:
        change a current through a transmitter on the electromagnetic instrument and induce a current in the earth formation; and
        estimate a distance to an interface in the earth formation using (i) a first temporal signal resulting from the induced current in the first receiver on the electromagnetic instrument, the received first temporal signal including an effect of a conductive body of the electromagnetic instrument; (ii) a second temporal signal resulting from the induced current in the second receiver on the electromagnetic instrument, the received second temporal signal including the effect of the conductive body of the electromagnetic instrument and (iii) a ratio between a first reference signal and a second reference signal, wherein estimating the distance comprises:

determining a time-dependent product of the ratio and the first temporal signal; and subtracting the product from the second temporal signal.

12. The apparatus of claim 11 the first reference signal and the second reference signal are obtained in the absence of the formation.

13. The apparatus of claim 11 wherein the transmitter has an axis substantially parallel to an axis of the electromagnetic instrument.

14. The apparatus of claim 11 wherein the first receiver and the second receiver are on the same side of the transmitter.

15. The apparatus of claim number 11 wherein the electromagnetic instrument is conveyed on a bottomhole assembly into the borehole.

16. The apparatus of claim 11 wherein the processor is further configured to use the determined distance for controlling a direction of drilling.

17. The apparatus of claim 11 wherein the interface further comprises a bed boundary.

18. The apparatus of claim 11 wherein the interface further comprises a fluid interface selected from: (i) a gas-oil interface, (ii) an oil-water interface, and (iii) a gas-water interface.

19. The apparatus of claim 11 wherein the reference signals are time-dependent.

20. The apparatus of claim 11 wherein the reference signals are obtained in the absence of the earth formation.

* * * * *